(12) United States Patent
Jankiewicz et al.

(10) Patent No.: US 11,684,048 B2
(45) Date of Patent: Jun. 27, 2023

(54) WATER FILTER FOR AN AQUARIUM

(71) Applicant: Aquael Sp. z o.o., Warsaw (PL)

(72) Inventors: Janusz Jankiewicz, Warsaw (PL); Jerzy Brzeski, Raszyn (PL); Stanislaw Konter, Warsaw (PL); Marcin Sienkiewicz, Warsaw (PL); Piotr Jankowski, Sobienie-Jeziory (PL)

(73) Assignee: AQUAEL Sp. zo.o., Warsaw (PL)

( * ) Notice: Subject to any disclaimer, the term of this patent is extended or adjusted under 35 U.S.C. 154(b) by 432 days.

(21) Appl. No.: 17/049,889

(22) PCT Filed: Apr. 25, 2019

(86) PCT No.: PCT/IB2019/053415
§ 371 (c)(1),
(2) Date: Oct. 22, 2020

(87) PCT Pub. No.: WO2019/207520
PCT Pub. Date: Oct. 31, 2019

(65) Prior Publication Data
US 2021/0068376 A1 Mar. 11, 2021

(30) Foreign Application Priority Data
Apr. 26, 2018 (PL) .......................... 425373

(51) Int. Cl.
*A01K 63/04* (2006.01)
*B01D 35/30* (2006.01)
(52) U.S. Cl.
CPC ............ *A01K 63/045* (2013.01); *B01D 35/30* (2013.01)
(58) Field of Classification Search
CPC ............... A01K 63/045; B01D 35/30
(Continued)

(56) References Cited

U.S. PATENT DOCUMENTS 5,474,674 A * 12/1995 Bresolin .............. A01K 63/045
210/232
6,187,179 B1 * 2/2001 Mayer .................. A01K 63/045
417/199.2
(Continued)

FOREIGN PATENT DOCUMENTS

EP 2281452 A1 * 2/2011 ........... A01K 63/045
EP 2281452 A1 2/2011

OTHER PUBLICATIONS

International Search Report in PCT/IB2019/053415 dated Jul. 19, 2019.
(Continued)

*Primary Examiner* — Madeline Gonzalez
(74) *Attorney, Agent, or Firm* — Ralph E. Jocke; Walker & Jocke

(57) ABSTRACT

Exemplary embodiments relate to a water filter for an aquarium comprising a housing with an interior area configured to house a plurality of filtration cartridges, at least one first clamp and at least one second clamp, and a cover with a lid in operative movable+connection therewith. The cover includes a roughing filter chamber that is in operative fluid connection with the housing interior area and a first connection port that is in operative fluid connection with a water inlet, and a second connection port in operative fluid connection with a water outlet and the housing interior area. The first and second clamps are in operative connection with the housing and are releasably engageable with a rim extending around the cover and the lid. In a disengaged position of the second clamp, the lid is movable between open and closed positions while the cover is maintained in engagement with the housing.

20 Claims, 10 Drawing Sheets

(58) Field of Classification Search
USPC ........... 210/136, 117, 167.21, 244, 255, 258, 210/262, 314, 335, 416.1, 440, 443, 455, 210/470
See application file for complete search history.

(56) References Cited

U.S. PATENT DOCUMENTS

| | | | |
|---|---|---|---|
| 6,645,376 B2* | 11/2003 | Marioni | A01K 63/045 |
| | | | 210/429 |
| 2003/0164324 A1* | 9/2003 | Chauquet | B01D 29/90 |
| | | | 210/234 |
| 2006/0060514 A1 | 3/2006 | Chauquet | |

OTHER PUBLICATIONS

Written Opinion of International Search Authority in PCT/IB2019/053415.

* cited by examiner

WATER FILTER FOR AN AQUARIUM

TECHNICAL FIELD

Exemplary embodiments relate to a water filter for an aquarium. The exemplary embodiments further relate to water filters for aquariums used in external water filtration systems for fish farming and in waterholes.

BACKGROUND

External filters for purification of water in aquariums and waterholes are connected to a dedicated water circuit by means of conduits that are positioned within water inlet and water outlet connecting ports secured in the filter cover. As a rule, such filters are separate, i.e. external, components of aquarium or waterhole equipment, and positioned close to the reservoir in which it operates.

Contaminated water fed into the filter passes a sequence of filtration stages and types in the course of which, suitably to the filtration cartridge or means used, mechanical, biological, and chemical filtration may be performed.

Due to the specific nature and effectiveness of water purification performed, it is preferable to perform mechanical filtration first—regardless of whether mechanical filtration is an exclusive or initial step of purification from mechanical impurities. The external filter draws water from an aquarium along with particulate wastes in it, including organic waste that causes very rapid clogging of the filtration media and consequently impairs effectiveness of the water purification process. The related necessity for frequent changes of filtration cartridges within the entire device causes a need for new constructional solutions to enable comfortable and easy access to the individual water purification levels.

Water filters for aquariums and waterholes may benefit from improvements.

SUMMARY

Exemplary embodiments provide an example of a better construction of an external water filter for aquariums, with an easier access to the individual filtration levels. Exemplary embodiments further provide an exemplary roughing filtration level, without the disassembling of the filter cover or components comprised by it as required by the prior art constructions.

The exemplary water filter for an aquarium according to exemplary embodiments comprises a housing in the form of a container of a canister type that is open at its upper end. The exemplary container includes side walls and a base that bound a housing interior area that is configured to house a plurality of removable filtration cartridges therein. The exemplary container further includes a cover that is operatively releasably attached to the housing in a closed position of the cover. The exemplary cover includes a priming arrangement and connection ports of water inlet and water outlet arrangements. The exemplary water inlet and water outlet arrangements are provided with valves in operative connection therewith. The exemplary water filter further includes a roughing filter chamber arranged in the exemplary cover, and that is in operative fluid connection with the housing. The exemplary roughing filter chamber is covered at its top by a lid arranged within the cover.

In exemplary embodiments, the exemplary cover body encompasses a cover jacket and cover side walls with a rim formed on their periphery. In exemplary embodiments, one part of the cover body includes a priming arrangement (also referred to herein as a priming pump), a water inlet arrangement, and a water outlet arrangement operatively positioned therein, and the other part of the body of the cover includes a roughing filter chamber that is configured to operatively house a roughing filtration cartridge therein.

In exemplary embodiments, the exemplary lid is suspended in the cover by means of hinges that are fastened in the head surface of the cover jacket.

In exemplary embodiments, the exemplary roughing filter chamber is connected to the water inlet arrangement by an inlet opening of the chamber, formed in its rear wall. The exemplary roughing filter chamber further includes a chamber outlet opening which is surrounded by a further jacket, wherein the height of the further jacket is not less than the height of the filtration cartridge in the roughing filter chamber.

In exemplary embodiments, an exemplary removable container for a roughing filtration cartridge is operatively positioned inside the roughing filter chamber. The exemplary removable container includes, in its rear wall, an inlet opening of the container that is positioned in corresponding fluid relation with the inlet opening of the chamber. The exemplary removable container further includes in its top wall, an outlet opening of the container which is positioned adjacent the entrance of the further jacket that surrounds the outlet opening of the chamber.

In exemplary embodiments, the exemplary inlet opening of the removable container is covered from the inside of the container by a pivotable flap suspended in operative connection with its rear wall.

In exemplary embodiments, the exemplary cover is fastened to the housing by means of a snap-fit connection.

In exemplary embodiments, the exemplary snap-fit connection comprises at least one first closing clamp and at least one second closing clamp. The exemplary at least one first closing clamp and at least one second closing clamp are in operative articulated connection with the side walls of the housing and snap-fit on the rim of the periphery of the cover.

In exemplary embodiments, the exemplary second closing clamp is suspended on rotatable arms. The exemplary rotatable arms bound the at least one first closing clamp on opposing sides of each first closing clamp. In an exemplary closed position of the at least one first and at least one second closing clamps, at least a portion of the at least one first closing clamp is covered by the at least one second closing clamp.

In exemplary embodiments, the exemplary at least one first closing clamp and the at least one second closing clamp terminate in hook-shaped ends.

In exemplary embodiments, each of the exemplary side walls of the exemplary housing include an identical configuration of the at least one first closing clamps and the at least one second closing clamps.

In exemplary embodiments, the exemplary lid is attached to the housing by means of three second closing clamps, seated on the respective adjacent side walls of the housing.

In exemplary embodiments, the exemplary water inlet arrangement has an inlet ball valve and at least one check valve.

In exemplary embodiments, the exemplary inlet ball valve is at least a double-seat valve.

In exemplary embodiments, the exemplary inlet ball valve is a double-seat valve.

In exemplary embodiments, the exemplary water filter includes two check valves that are positioned downstream the inlet valve and upstream the roughing filter chamber.

In exemplary embodiments, the exemplary check valves are constituted by a first movable closing flap and a second movable closing flap.

In exemplary embodiments, the exemplary water inlet arrangement has an outlet ball valve.

In exemplary embodiments, the exemplary outlet ball valve is at least a double-seat valve.

In exemplary embodiments, the exemplary outlet ball valve is a double-seat valve.

In exemplary embodiments, the exemplary filtration cartridges are arranged in independently removable containers operatively positioned in an interior area of the housing.

Further features of exemplary embodiments will be made apparent from the following detailed description.

DETAILED DESCRIPTION

Exemplary arrangements may include structures known in the prior art. For example, document EP 2356900 B1 discloses an example of an external filter for purifying water in an aquarium, comprising a chamber of mechanical filtration, constituting a part of water purification, extending vertically inside the housing of the filter, and separated from the main filtration unit. Within the mentioned mechanical filtration chamber, a first step of water purification is carried out, to separate particles or mechanical debris therefrom. The mechanical debris filtered out in the chamber is then conveyed to a removable drawer at the bottom of the filter. Access to the mechanical filtration chamber and the main filtration unit within the filter is possible only by removing a filter cover attached to its housing by means of a snap-fit connection. The document EP 2356900 B1 is incorporated herein by reference in its entirety.

In another exemplary structure as shown in document EP 1832164 B1, an external filter for an aquarium with an additional level of a roughing filter is positioned at the upper part of the device, just beneath the cover. The main filtration chamber is positioned inside the housing in its central part and below the roughing filter. Water fed to the filter is conveyed downwards within the device and, first of all, passes through the roughing filtration level, and then upwards to an outlet provided in the cover—it flows through subsequent filtration levels in the main chamber of the filter container. Access to the individual filtration levels is possible only by removing the entire cover positioned on the device housing. The document EP 1832164 B1 is incorporated herein by reference in its entirety.

In these examples of water filter constructions disclosed in the prior art, access to filtration levels is possible exclusively upon removal of the entire cover which entails a necessity to remove water circulation conduits and/or at least the water inlet and outlet ports arranged in the cover. The exemplary embodiments disclosed herein overcome these problems present in the prior art, and include other improvements over the prior art.

Figure 1:
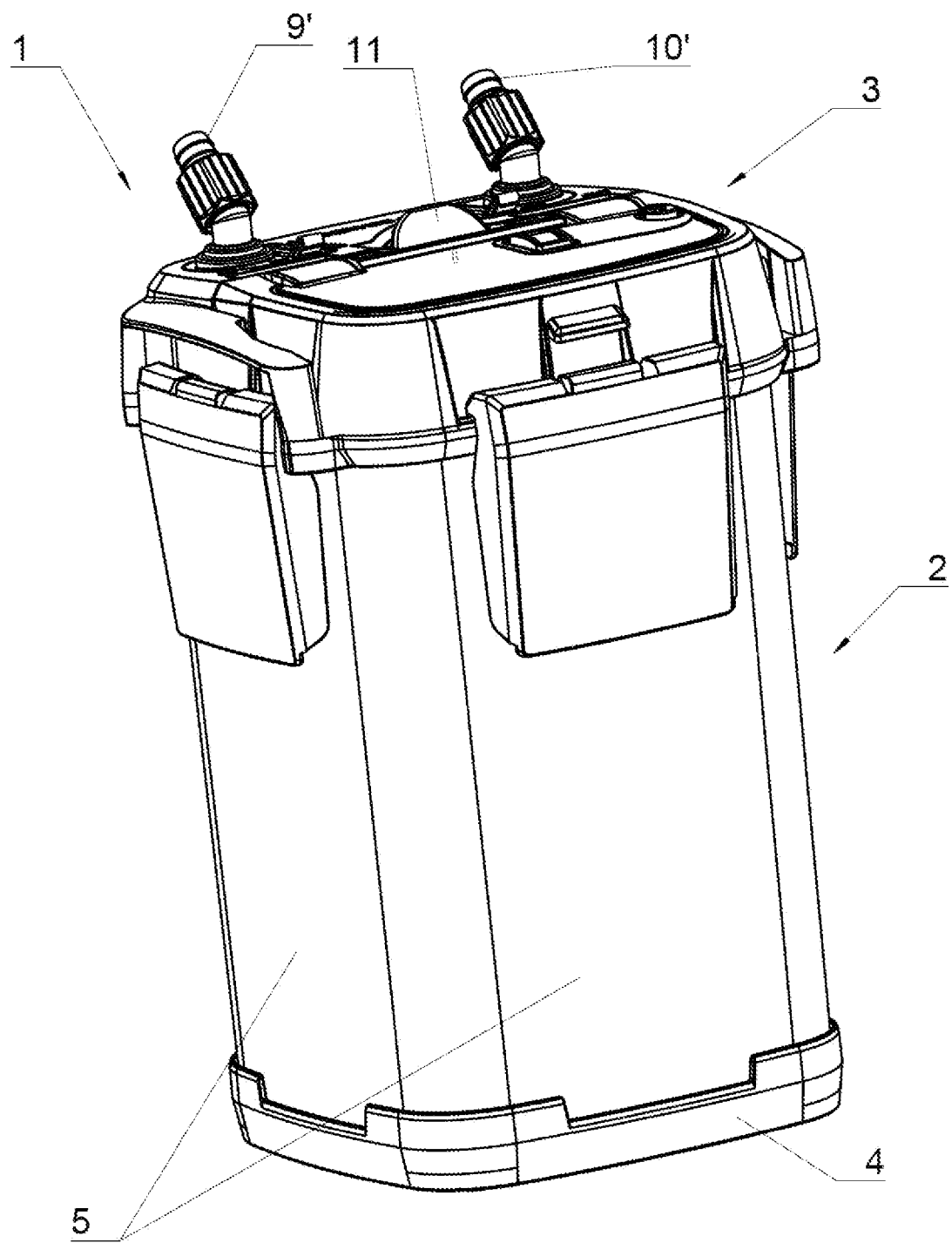
FIG. 1 shows a perspective view of an exemplary water filter for an aquarium according to the exemplary embodiments.
Figure 2:
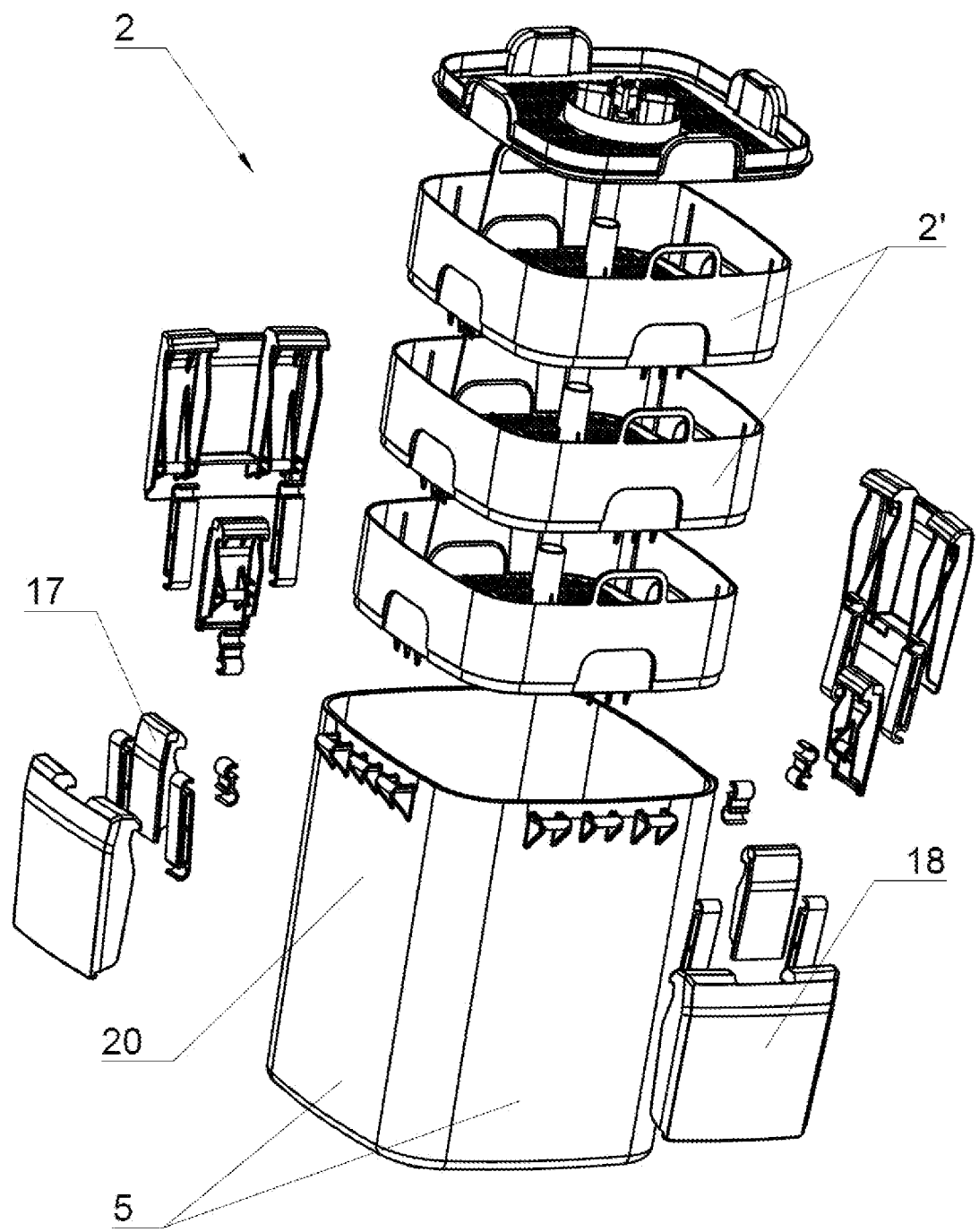
FIG. 2 shows an exploded view of an exemplary housing of an exemplary water filter for an aquarium according to the exemplary embodiments.
Figure 4:
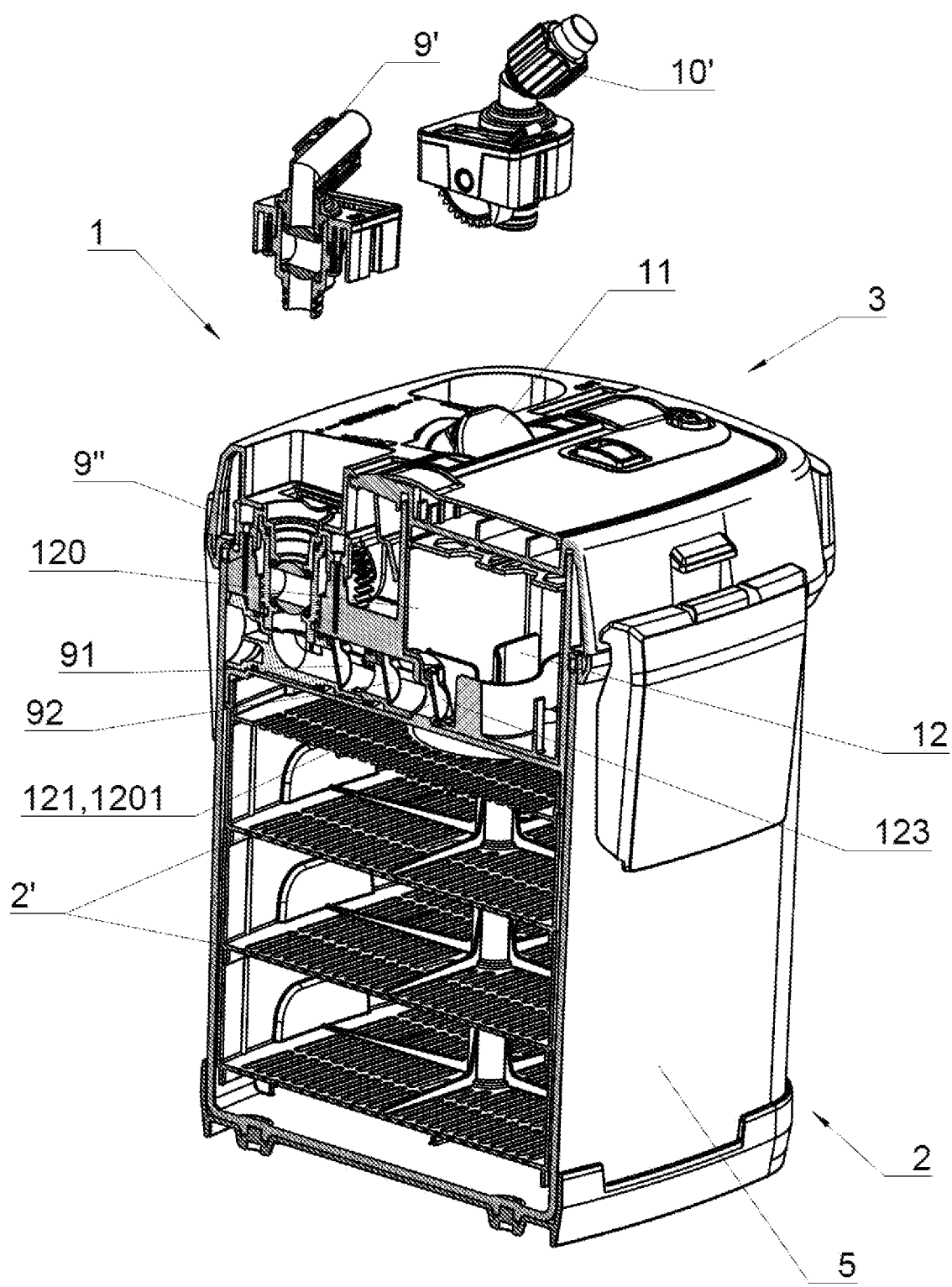
FIG. 4 shows a cross-sectional view illustrating a water inlet arrangement and a roughing filter chamber, with detached connection ports, as well as a lid closed position with the exemplary at least one second clamp in the engaged position.
Figure 5:
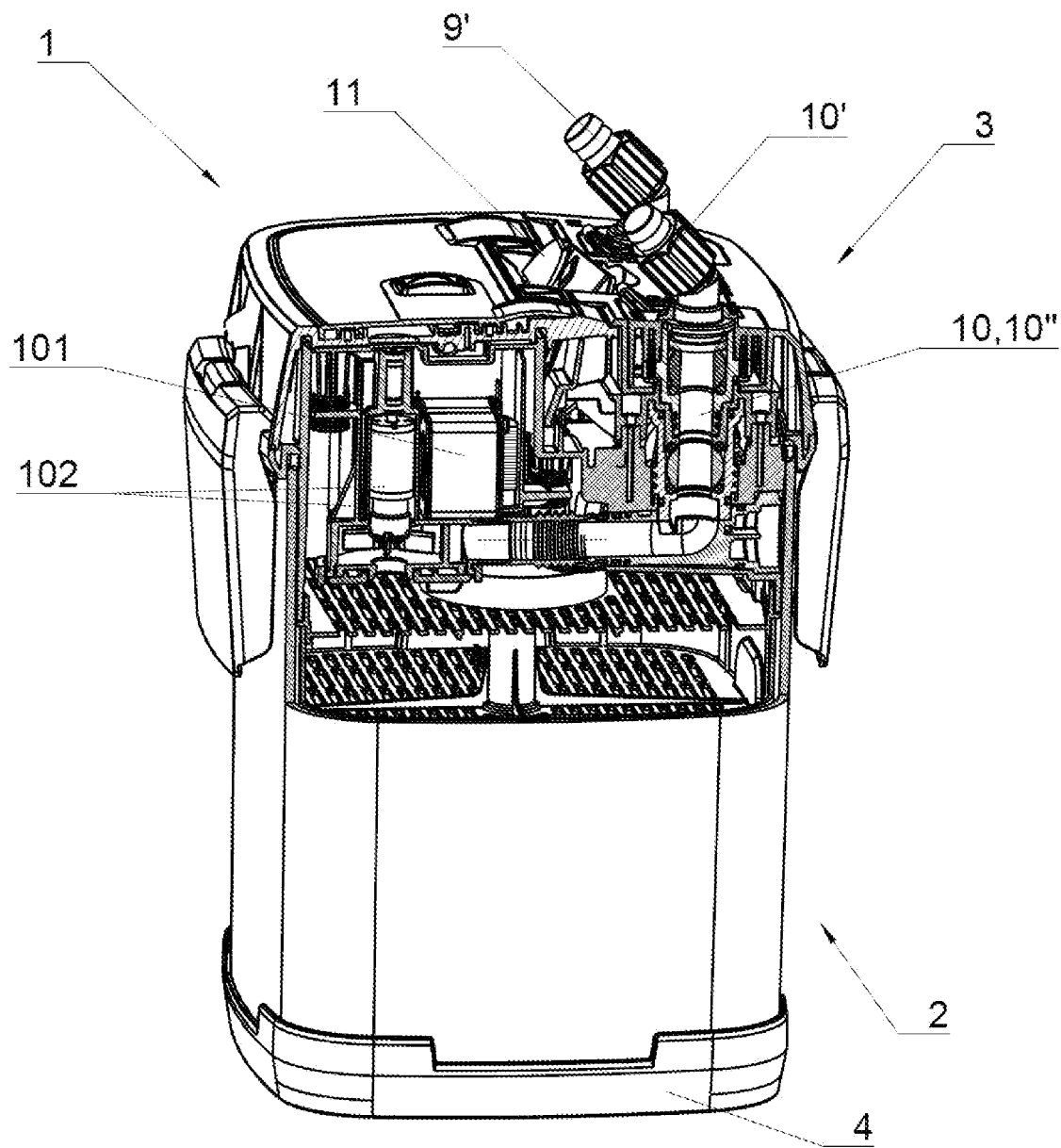
FIG. 5 shows a cross-sectional view illustrating an exemplary water outlet arrangement.

Referring to FIG. 1, an exemplary water filter 1 for an aquarium comprises a housing 2 and a cover 3 secured thereto. The exemplary housing 2 is formed as a vertical, canister type container that includes an opening at its top. The exemplary housing 2 includes side walls 5 that are seated in a base 4 and which, along with the base 4, bounds a housing interior area. Inside the exemplary housing 2, filtration cartridges may be removably arranged that may be comprised of standard filtration media, such as for example activated carbon or foam cartridges. The exemplary filtration cartridges are arranged in exemplary removable containers 2', which as shown in FIG. 2, 4 or 5, are operatively arranged inside the housing 2, one above another, and form a vertical set of sequenced levels of filtration cartridges and are independently removable with respect to the other containers 2'.

Figure 6:
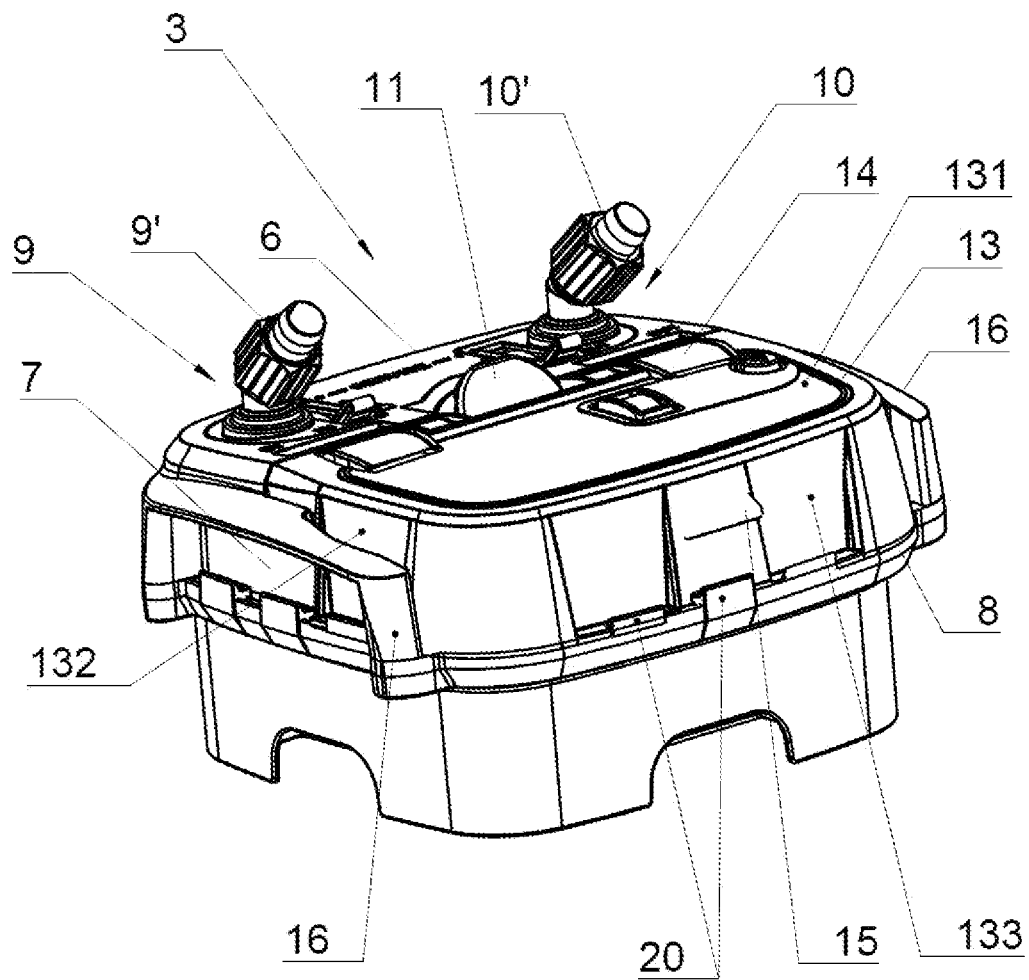
FIG. 6 shows a perspective view of an exemplary filter cover.

The exemplary cover 3 is operatively removably secured to the housing 2 in fixed operatively attached engagement. As shown in FIG. 6, the exemplary cover 3 has a body that includes a jacket 6 and side walls 7 with a rim 8 formed on their perimeter. The rim 8, as will be described in more detail later, is operative to releasably engage at least one first clamp and at least one second clamp. During mounting of the exemplary cover 3 on the housing 2, the body of the cover 3 includes a section below the rim 8 that is seated inside the side walls 5 of the housing 2, so that the mentioned section of the body of the cover 3 below the rim 8 remains invisible during operation of the filter 1, and the exemplary cover 3 is in operatively attached engagement with the housing 2.

According to the exemplary embodiments shown, the cover 3 includes a body. In one part of the body of the exemplary cover 3, a first connection port 9' and a second connection port 10' are arranged for water inlet 9 and water outlet 10 arrangements, respectively. The first connection port 9' is in operative fluid connection with the water inlet 9 and the inlet valve 9". The second connection port 10' is in operative fluid connection with the water outlet 10 and the outlet valve 10". Also positioned within the exemplary cover 3, is a piston 11 of a priming arrangement (also referred to herein as a priming pump). The priming pump is in operative fluid connection with the first connection port 9'. In a second part of the body of the exemplary cover 3 a chamber of a roughing filter 12 is formed, intended for effecting roughening mechanical filtration therein. The roughing filter chamber 12 is operative to remove physical particles and/or mechanical debris included in the water passing through the roughing filter chamber 12.

Figure 3:
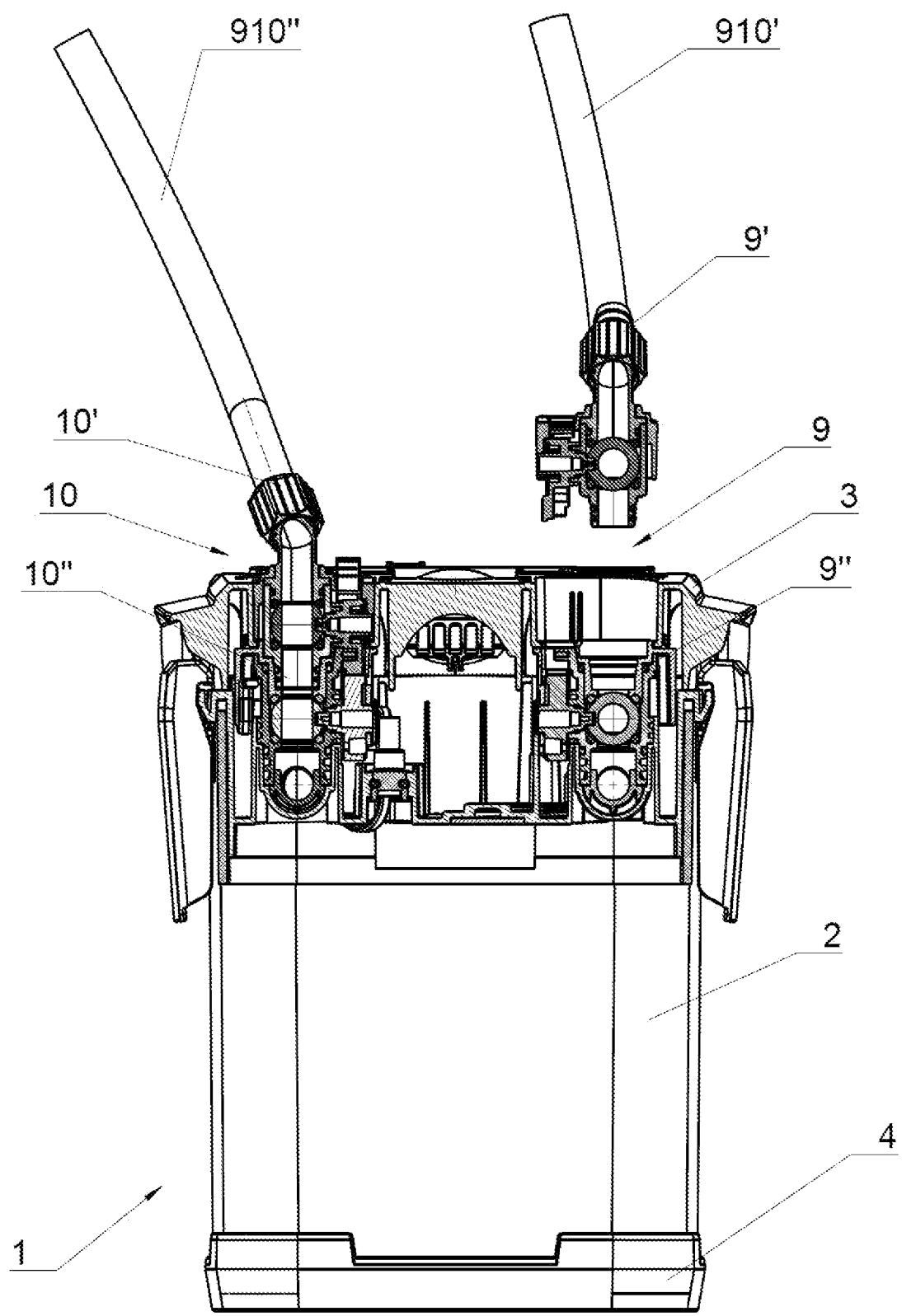
FIG. 3 shows a partial and simplified cross-sectional view illustrating an exemplary water inlet arrangement and an exemplary water outlet arrangement.

FIG. 3 shows a partial and simplified cross-sectional view of the exemplary filter 1 illustrating the exemplary water inlet 9 arrangement and the exemplary water outlet 10 arrangement. In the exemplary cover 3, removable connection ports 9' and 10' are secured for the water inlet 9 and the water outlet 10 arrangements, respectively. In operative connection with the exemplary ports 9' and 10', a water draining conduit 910' and a water supply conduit 910" are connectable from and to a reservoir of an aquarium or a water hole (not shown), in which the filter 1 operates. The exemplary connection ports 9' and 10' are connectable to the water inlet 9 arrangement and water outlet 10 arrangement to form the inlet valve 9" and the outlet valve 10", respectively, which according to some exemplary embodiments are double-seated ball valves.

Construction of the exemplary water inlet 9 arrangement is shown in FIG. 4. According to FIG. 4, downstream of the double-seated ball valve 9" is the exemplary water inlet 9 arrangement that is cooperating with a priming arrangement (not shown), two check valves operatively arranged in order to prevent water backflow during priming the filter 1. The exemplary check valves are comprised of a first movable closing flap 91 and a second movable closing flap 92. The use of exemplary check valves 91 and 92 prevents water backflow during priming the filter 1 and thus enables guiding water from an aquarium or a waterhole directly to the chamber of the roughing filter 12, connected to the water inlet arrangement, and then to the subsequent filtration cartridges provided in the housing 2 of the filter 1. That is, the first and second movable closing flaps allow water to flow from the inlet ball valve 9" to the roughing filter chamber 12, and prevent back flow of water from the roughing filter chamber 12 to the inlet valve 9".

As presented in FIG. 5, in exemplary embodiments, water finally filtered inside the housing 2 is drawn by a pump 102 that is driven by a motor 101, and directed to a water outlet 10 arrangement terminated in the second connection port 10', and then it is guided through a draining conduit 910" to a reservoir of the aquarium or waterhole (not shown).

Figure 7:
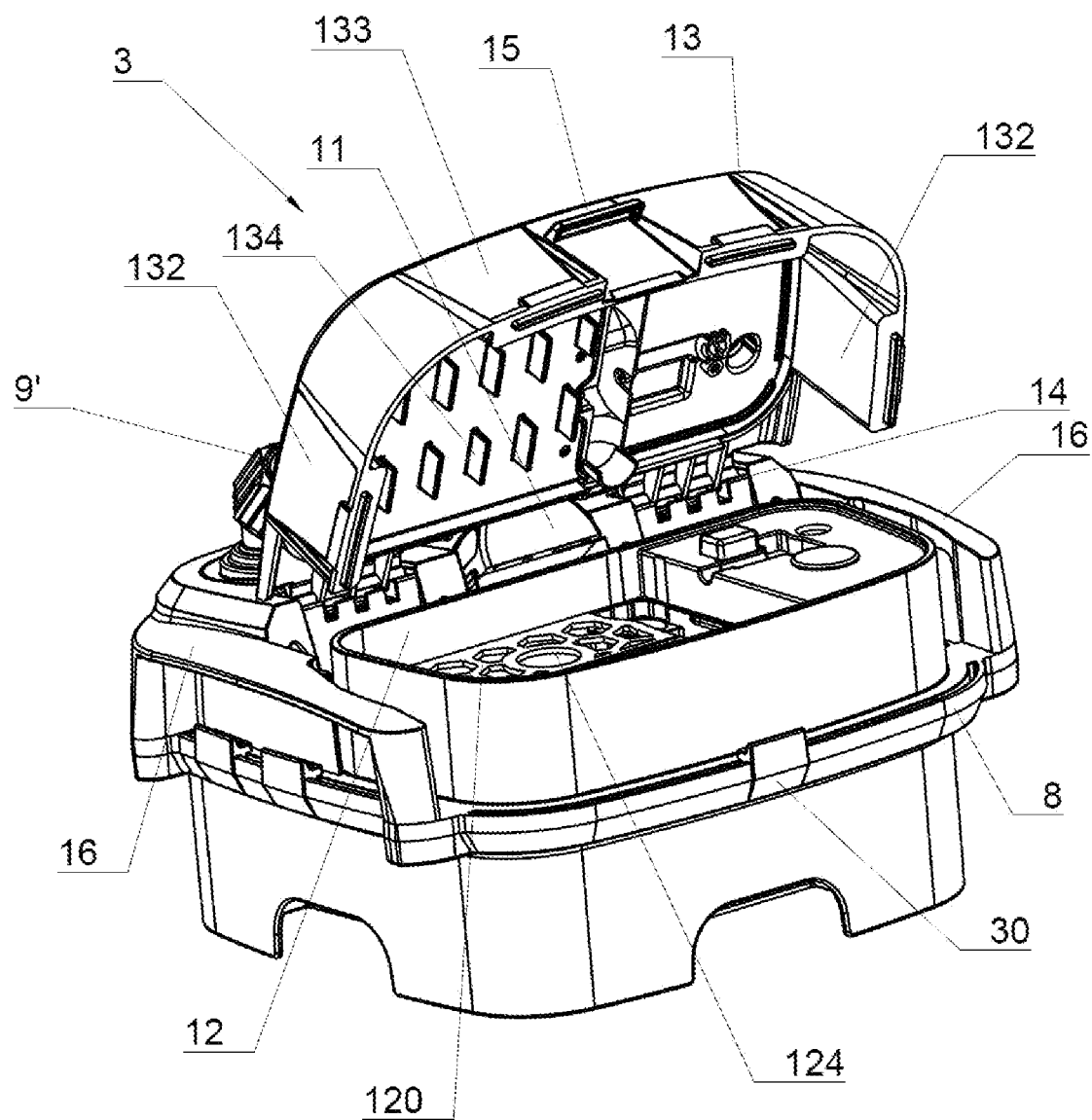
FIG. 7 shows a perspective view of an exemplary filter cover with an exemplary open lid.

The exemplary roughing filter chamber 12 is externally covered with an openable lid 13. In some exemplary embodiments, the lid 13 is in operative movable connection with the cover 3, and is movable between a lid closed position and a lid open position. In the closed position of the lid 13, the lid 13 forms a continuous body of the jacket 6 of the cover 3. The exemplary lid 13 has a top wall 131, side walls 132, and a front wall 133. According to the exemplary embodiments shown in FIGS. 6-8, the exemplary lid 13 is pivotably suspended on hinges 14 which are secured on the head surface of the jacket 6 of the cover 3. The exemplary lid 13 is openable by means of a handle 15 formed in its front wall 133.

Apart from the exemplary handle 15 of the exemplary lid 13, the exemplary cover 3 is also provided with handles 16, to enable its comfortable and easy removal of the filter 1 from the housing 2 by a user. According to exemplary embodiments, the exemplary cover 3 has two handles 16, positioned on the side walls 7 of the cover 3, perpendicularly to the surface on which the handle 15 of the lid 13 is positioned.

Figure 8:
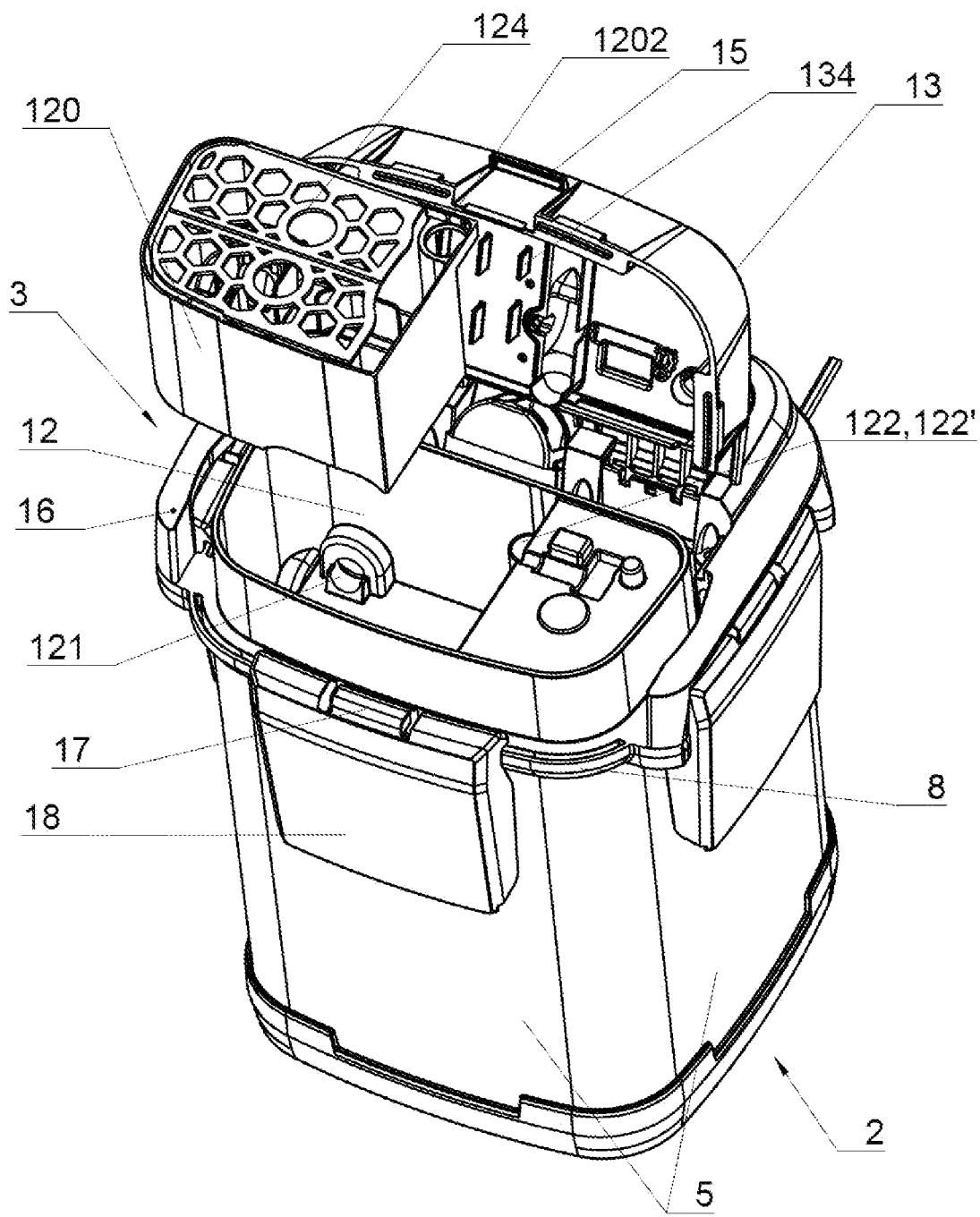
FIG. 8 shows a perspective view from the top of an exemplary filter, in an exemplary open position of the lid, illustrating an exemplary roughing filter chamber.

According to FIG. 8, the exemplary roughing filter chamber 12 includes an inlet opening 121 formed therein. The roughing filter chamber inlet opening 121 is configured to be in operative fluid connection with the water inlet arrangement 9 and the first connection port 9'. The inlet opening 121 is formed in a wall of the roughing filter chamber 12. The roughing filter chamber 12 further includes an outlet opening 122. The roughing filter chamber outlet opening 122 is in operative fluid connection with the interior area of the housing 2 and guides water further to the inside of the housing 2 and the filtration cartridges provided therein. The exemplary outlet opening of the chamber 122 is surrounded by a further jacket 122', the height of which is not less than the height of an exemplary filtration cartridge inside the chamber of the roughing filter 12.

In the exemplary chamber of the roughing filter 12, a removable container 120 for the filtration cartridge is operatively arranged. The exemplary removable container 120 for the filtration cartridge includes in its rear wall, an inlet opening 1201. The removable container inlet opening 1201 is in corresponding operative fluid connection with the inlet opening 121 of the chamber of the roughing filter 12. In exemplary embodiments, the exemplary removable container 120 is operatively positioned in the chamber of the roughing filter 12 such that the relative positions of the inlet opening 1201 of the removable container 120 and the inlet opening 121 of the chamber 12 overlap to form a water inlet 9 arrangement within the chamber of the roughing filter 12. In exemplary embodiments as shown in FIG. 4, the exemplary inlet opening 1201 of the removable container 120 is covered from the inside of the container 120 by a pivotable flap 123 suspended in operative connection with a rear wall of the removable container 120 (as shown in FIG. 4). The exemplary flap 123 is used to prevent water entering the housing interior area during withdrawal of the roughing filtration cartridge from the container 120.

The exemplary removable container 120 for the roughing filtration cartridge additionally has, formed in a top wall thereof, an outlet opening 1202. The exemplary removable container outlet opening 1202, when the container 120 is operatively placed in the chamber of the roughing filter 12, becomes coupled to the entrance of the further jacket 122' that surrounds the outlet opening 122 of the chamber 12.

According to the exemplary embodiments, the exemplary removable container 120 for the filtration cartridge has, formed in its top wall, a plurality of openings 124 that enable free and comfortable removal of the container 120 from the chamber of the roughing filter 12 by the user. At the same time, on the inner side of the top wall 131 of the exemplary lid 13, pressing elements 134 are formed that, with the exemplary lid 13 in a lid closed position, press through the openings 124. In the exemplary embodiments, the exemplary roughing filtration cartridge (not shown) is intended to be operatively placed in the removable container therein.

Figure 9:
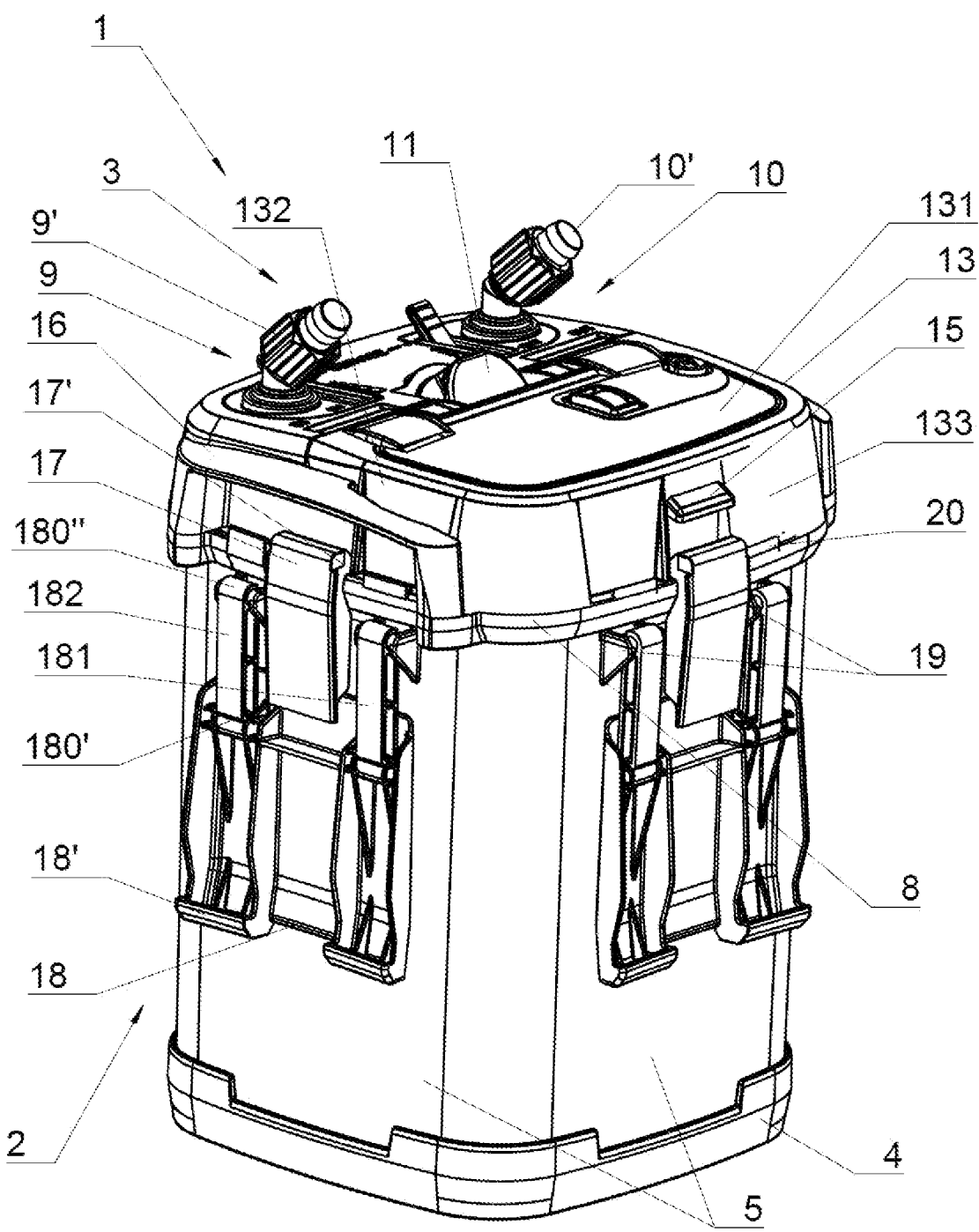
FIG. 9 shows an exemplary securing configuration of a cover in an exemplary closed position of the exemplary lid.
Figure 10:
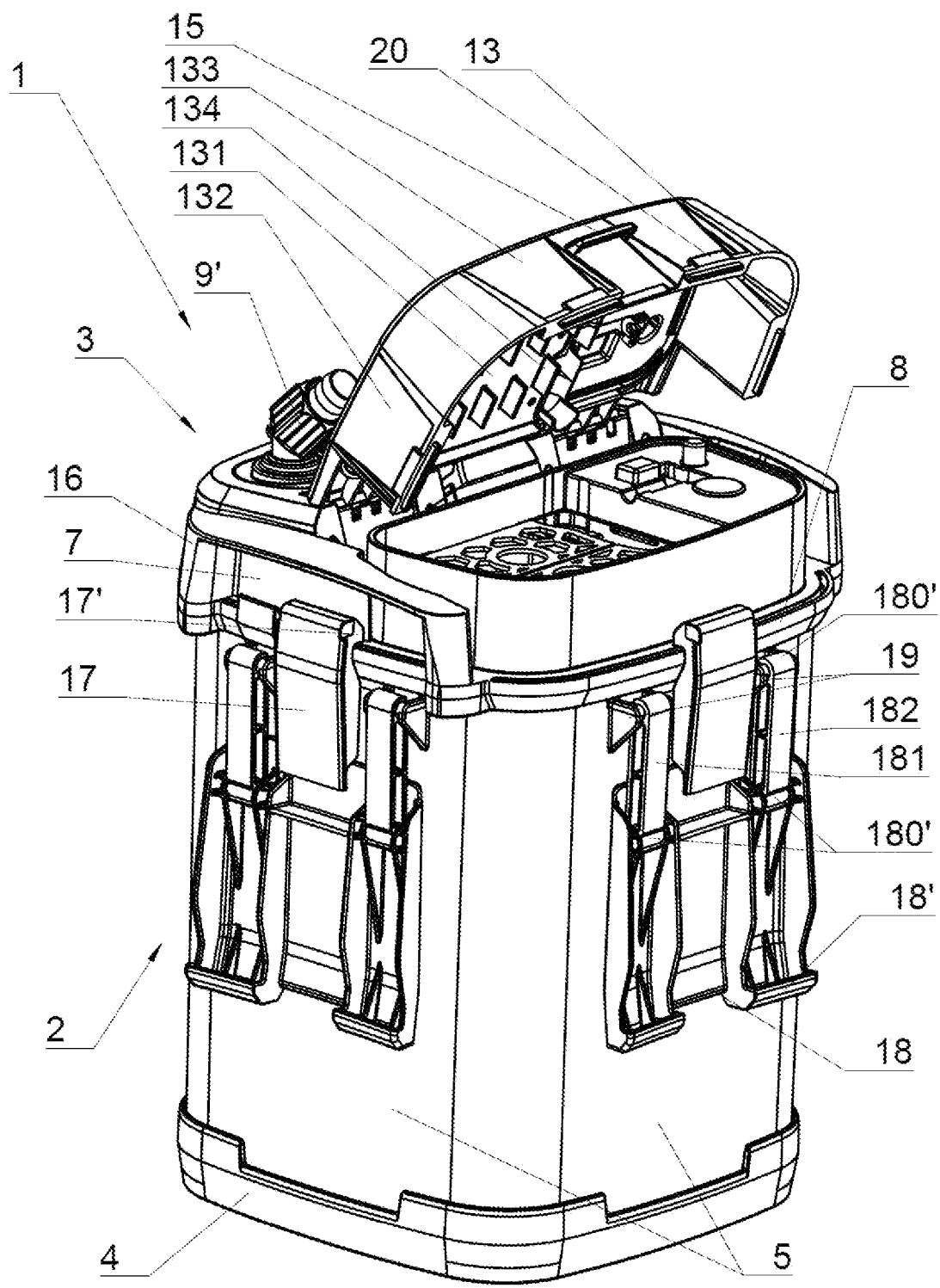
FIG. 10 shows a view analogous as in FIG. 8, in an exemplary open lid position and a disengaged position of the at least one second closing clamp.

As shown in FIGS. 9 and 10, the exemplary cover 3 is secured to the housing 2 by means of an exemplary at least one first closing clamp 17 and an exemplary at least one second closing clamp 18. The at least one first 17 and the at least one second 18 closing clamps snap on a rim 8 of the periphery of the cover 3. The exemplary at least one first 17 and at least one second 18 closing clamps are operatively seated in the side walls 5 of the housing 2 by means of articulation joints 19, an exemplary arrangement thereof is shown in an exploded view in FIG. 2. In other exemplary embodiments, the at least one first 17 and the at least one second clamps 18 are in operatively attached connection with the housing 2. The exemplary at least one first closing clamp 17 is operatively movable between an engaged position in which the at least one first clamp 17 operatively engages the cover 3 to fix the cover 3 in operatively attached engagement with the housing 2, and a disengaged position in which the at least one first clamp 17 is disengaged from the cover such that the cover 3 may be removed from the housing 2. The exemplary at least one second clamp 18 is operatively movable between an engaged position in which the at least one second clamp 18 is in operative engagement with the cover and at least an area corresponding to the lid 13, to fix the lid 13 in the lid closed position, and a disengaged position in which the at least one second clamp 18 is disengaged from the lid 13 to permit the lid 13 to be moved between the lid closed position and the lid open position. The exemplary at least one first clamp 17 and the exemplary at least one second clamp 18 are independently movable between their respective engaged and disengaged positions.

The exemplary first closing clamp 17 includes a hook terminating end 17'. In some exemplary embodiments, the hook terminating end 17' is in a position corresponding to a half of the height of the side wall 5 and below its upper edge. On both sides around the exemplary at least one first closing clamp 17, on the side wall 5 of the housing 2, the exemplary at least one second closing clamp 18 is operatively hingedly attached.

The exemplary at least one second closing clamp 18 is configured to be in a form of a profiled plate with hook-shaped terminating ends 18'. The exemplary at least one second closing clamp 18 is rotationally suspended on first ends 180' of a first arm 181 and a second arm 182. The exemplary second ends 180" of the exemplary first 181 and second 182 arms are suspended rotationally in articulated joints 19. In the closed position of the two closing clamps 17 and 18 at least a portion of the first closing clamp 17 is operatively covered by the second closing clamp 18 extending thereabove.

According to the exemplary embodiments of the water filter 1 for an aquarium, on each of the side walls 5 of the housing 2 an identical configuration of the exemplary first 17 and second 18 closing clamps is provided. This exemplary configuration provides freedom for positioning, as to orientation, of the seating of the cover 3 in the housing 2, i.e. regardless of the positioning of the arrangements of the inlet 9 and outlet 10 and, in particular, the chamber of the roughing filter 12.

As shown in FIGS. 9 and 10, the exemplary configuration of attachment of the exemplary cover 3 to the exemplary housing 2 is ensured by the exemplary first closing clamp 17 and the exemplary second closing clamp 18 positioned on each of the side walls 5 of the housing 2. The exemplary configuration of a snap-fit connection is made as a result of intermeshing of the exemplary hook-shaped terminal ends 17' and 18' of the closing clamps, corresponding to the at least one first closing clamps 17 and the at least one second closing clamps 18, with tongues 20 formed within the rim 8 of the periphery of the cover 3. That is, in the engaged position of the at least one first clamp 17 and the at least one second clamp 18, each respective hook-shaped terminating end is operatively engaged in snapped relation over the rim 8 extending around the body of the cover.

In exemplary embodiments, the exemplary lid 13 includes a front wall 133 that is attached to the housing 2 by means of the entire at least one second closing clamp 18, seated on the respective side wall 5 of the housing 2. Attachment of the side walls 132 of the lid 13 is in turn ensured by snap-fit intermeshing effected solely by the closest, relative to the surface of the front wall 133 of lid 13, hook-shaped terminating end 18' of the second closing clamp 18, secured on the respective side wall 5 of the housing 2.

Release of the respective exemplary second closing clamps 18 from the engaged position to the disengaged position enables opening of the lid 13, while maintaining attachment of the cover 3, provided by closed first closing clamps 17 in the engaged position, and possibly the remaining non-released second closing clamp 18, positioned at the rear part of the filter 1, that is not engaged with the portion of the rim 8 extending around the body of the cover 3 that is comprised of the lid 13. In exemplary embodiments, the exemplary lid 13 includes catches or tongues 20 that are intermeshed with the hook-shaped terminal ends 18' of the second closing clamps 18 that secure the lid 13, and that are positioned at the lower edges of the exemplary walls 132, 133 of the lid 13.

The exemplary embodiments described herein for securing the lid 13 provides for a possibility of free access to the exemplary chamber of the roughing filter 12 positioned within the cover 3, without any necessity to remove the cover 3. In exemplary embodiments, with the lid 13 in the lid closed position and the at least one second clamp 18 in the engaged position, the at least one second clamp is operative to engage the lid 13 to fix the lid 13 in the closed position. In exemplary embodiments, the lid 13 is movable from the lid closed position to the lid open position when the at least one first clamp is in the engaged position by movement of the at least one second clamp 18 to the disengaged position. In other words, in exemplary embodiments, the lid 13 is openable with the cover 3 in fixed operative attachment with the housing 2. Further, in exemplary embodiments, with the at least one second clamp 18 in the disengaged position, the lid 13 is movable to the lid open position when the cover 3 is in operatively attached engagement with the housing 2. Still further, in exemplary embodiments, the lid 13 is movable to the lid open position when the cover 3 is in operatively attached engagement with the housing 2.

It should be clear that the exemplary embodiments are not limited to the above presented exemplary arrangements and that diverse modifications and developments thereof are possible.

Thus, the exemplary embodiments achieve improved operation, eliminate difficulties encountered in the use of prior art devices and systems, and obtain the useful results described herein.

In the foregoing description, certain terms have been used for brevity, clarity, and understanding. However, no unnecessary limitations are to be implied therefrom because such terms are used for descriptive purposes only and are intended to be broadly construed. Moreover, the description and illustrations herein are by way of examples only, and the new and useful concepts are not limited to the features shown and described.

It should be understood that features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

Having described the features, discoveries, and principles of the exemplary embodiments, the manner in which they are constructed and operated, and the advantages and useful results attained, the new and useful features, devices, arrangements, parts, combinations, systems, equipment, operations, methods, processes, and relationships are set forth in the appended claims.

The invention claimed is:

1. Apparatus comprising:
   a water filter for an aquarium, wherein the water filter comprises
   a housing, wherein the housing includes a base and side walls that bound a housing interior area,
an opening to enable access to the housing interior area,
wherein the housing interior area is configured to house a plurality of filtration cartridges,
at least one first clamp and at least one second clamp,
wherein the at least one first clamp and the at least one second clamp are in operatively attached connection with the housing, and
wherein the at least one first clamp and the at least one second clamp are each independently movable between an engaged position and a disengaged position,
a cover,
wherein the cover is releasably engageable with the housing, wherein with the cover in operatively attached engagement with the housing,
the cover closes the housing opening, and
with the at least one first clamp in the engaged position, the at least one first clamp is operative to engage the cover to fix the cover in engagement with the housing,
wherein the cover includes in operative attached connection therewith,
a priming pump, a first connection port, a second connection port, an inlet valve, and an outlet valve,
wherein the priming pump is in operative fluid connection with the first connection port,
wherein the first connection port is in operative fluid connection with a water inlet and the inlet valve, and
wherein the second connection port is in operative fluid connection with a water outlet, the outlet valve, and the housing interior area,
a roughing filter chamber,
wherein the roughing filter chamber is in operative fluid connection with the first connection port and the housing interior area, wherein particles are removed from water passing through the roughing filter chamber,
a lid,
wherein the lid is in operative movable connection with the cover,
wherein the lid is movable between a lid open position and a lid closed position, wherein with the lid in the lid closed position,
the lid is operative to close the roughing filter chamber, and
with the at least one second clamp in the engaged position, the at least one second clamp is operative to engage the lid to fix the lid in the closed position,
wherein the lid is movable from the lid closed position to the lid open position when the at least one first clamp is in the engaged position by movement of the at least one second clamp to the disengaged position, wherein the lid is openable with the cover in fixed operatively attached engagement with the housing.

2. The apparatus according to claim 1
wherein the cover includes a rim extending around the body of the cover, wherein the at least one first clamp and the at least one second clamp are operative to releasably engage the rim.

3. The apparatus according to claim 2
wherein the lid is in operative hinged connection with the cover.

4. The apparatus according to claim 3
wherein the roughing filter chamber includes
a roughing filter chamber inlet opening, wherein the roughing filter chamber is in operative fluid connection with the first connection port via the roughing filter chamber inlet opening,
a roughing filter chamber outlet opening, wherein the roughing filter chamber is in operative fluid connection with the housing interior area via the roughing filter chamber outlet opening.

5. The apparatus according to claim 4
wherein the roughing filter chamber includes a roughing filter chamber interior area,
wherein the roughing filter chamber interior area includes a removable container that is insertable in and removable from the roughing filter chamber interior area,
wherein the removable container is configured to operatively house a roughing filter cartridge therein.

6. The apparatus according to claim 5
wherein the removable container includes
a rear wall, wherein the rear wall includes a removable container inlet opening in corresponding operative fluid connection with the roughing filter chamber inlet opening, and
a top wall, wherein the top wall includes a removable container outlet opening in corresponding operative fluid connection with the roughing filter chamber outlet opening.

7. The apparatus according to claim 6
wherein the rear wall of the removable container further includes a pivotable flap in operative connection therewith,
wherein the pivotable flap is movable between a pivotable flap open position and a pivotable flap closed position,
wherein in the pivotable flap closed position, the pivotable flap is operative to fluidly close the removable container inlet opening.

8. The apparatus according to claim 7
wherein the at least one first clamp and the at least one second clamp are in operative hinged connection with a respective side wall of the housing.

9. The apparatus according to claim 8
wherein the at least one second clamp is operatively suspended on a pair of rotatable arms, wherein the pair of rotatable arms are
disposed on opposing sides of the at least one first clamp, and
in operative connection with the respective side wall of the housing,
wherein in the engaged position of the at least one first clamp and in the engaged position of the at least one second clamp, at least a portion of the first clamp is covered by the at least one second clamp.

10. The apparatus according to claim 9
wherein each of the at least one first clamp and the at least one second clamp include a respective hook shaped terminating end,
wherein in the engaged position of the at least one first clamp and the at least one second clamp, each respective hook shaped terminating end is operatively engaged in snapped relation over the rim extending around the body of the cover.

11. The apparatus according to claim 10
wherein each side wall of the housing includes at least one first clamp and at least one second clamp in operative connection therewith.

12. The apparatus according to claim 11
wherein the inlet valve comprises an inlet ball valve and at least one check valve.

13. The apparatus according to claim 12
wherein the inlet ball valve is a double seat valve.

14. The apparatus according to claim 13
wherein the at least one check valve comprises two check valves, wherein the two check valves are operatively positioned fluidly downstream of the inlet ball valve and fluidly upstream of the roughing filter chamber.

15. The apparatus according to claim 14
wherein one of the two check valves comprises a first movable closing flap and the other of the two check valves comprises a second movable closing flap,
  wherein the first and second movable closing flaps allow water flow from the inlet ball valve to the roughing filter chamber, and prevent backflow of water from the roughing filter chamber to the inlet ball valve.

16. The apparatus according to claim 15
wherein the outlet valve comprises an outlet ball valve.

17. The apparatus according to claim 16
wherein the outlet ball valve is a double seat valve.

18. The apparatus according to claim 17
wherein each of the plurality of filtration cartridges positioned within the housing interior area is operatively removably positioned within a respective filtration cartridge container, and
wherein each filtration cartridge container is operatively removably positioned within the interior area of the housing, wherein each filtration cartridge is independently removable.

19. Apparatus comprising:
a water filter for an aquarium, wherein the water filter comprises
a housing, wherein the housing includes
  a base and side walls that bound a housing interior area,
  an opening to enable access to the housing interior area,
  wherein the housing interior area is configured to house a plurality of filtration cartridges,
at least one first clamp and at least one second clamp,
  wherein the at least one first clamp and the at least one second clamp are in operatively attached connection with the housing, and
  wherein the at least one first clamp and the at least one second clamp are each independently movable between an engaged position and a disengaged position,
an inlet valve and an outlet valve,
a cover,
  wherein the cover is releasably engageable with the housing, wherein with the cover in operatively attached engagement with the housing,
    the cover closes the housing opening, and
    with the at least one first clamp in the engaged position, the at least one first clamp is operative to engage the cover to fix the cover in engagement with the housing,
  wherein the cover includes in operatively attached connection therewith,
    a priming pump, a first connection port, and a second connection port,
      wherein the priming pump is in operative fluid connection with the first connection port,
      wherein the first connection port is in operative fluid connection with a water inlet and the inlet valve, and
      wherein the second connection port is in operative fluid connection with a water outlet, the outlet valve, and the housing interior area,
    a roughing filter chamber,
      wherein the roughing filter chamber is in operative fluid connection with the first connection port and the housing interior area, wherein the roughing filter chamber is operative to remove particles from water passing therethrough,
    a lid,
      wherein the lid is in operative movable connection with the cover,
      wherein the lid is movable between a lid open position and a lid closed position, wherein with the lid in the lid closed position,
        the lid is operative to close the roughing filter chamber, and
        with the at least one second clamp in the engaged position, the at least one second clamp is operative to engage the lid to fix the lid in the closed position,
      wherein with the at least one second clamp in the disengaged position, the lid is movable to the lid open position when the cover is in operatively attached engagement with the housing.

20. Apparatus comprising:
a water filter for an aquarium, wherein the water filter comprises
a housing, wherein the housing includes
  a base and side walls that bound a housing interior area,
  an opening to enable access to the housing interior area,
  wherein the housing interior area is configured to house a plurality of removable filtration cartridges,
an inlet valve and an outlet valve,
a cover,
  wherein the cover is releasably engageable with the housing, wherein with the cover in operatively attached engagement with the housing, the cover closes the housing opening, and
  wherein the cover includes in operatively attached connection therewith,
    a priming pump, a first connection port, and a second connection port,
      wherein the priming pump is in operative fluid connection with the first connection port,
      wherein the first connection port is in operative fluid connection with a water inlet and the inlet valve, and
      wherein the second connection port is in operative fluid connection with a water outlet, the outlet valve, and the housing interior area,
    a roughing filter chamber,
      wherein the roughing filter chamber is in operative fluid connection with the first connection port and the housing interior area, wherein water passing through the roughing filter chamber has particles removed therefrom,
    a lid,
      wherein the lid is in operative movable connection with the cover,
      wherein the lid is movable between a lid open position and a lid closed position, wherein with the lid in the lid closed position, the lid is operative to close the roughing filter chamber, and wherein the lid is movable to the lid open position when the cover is in operatively attached engagement with the housing.

* * * * *